Patented Dec. 6, 1938

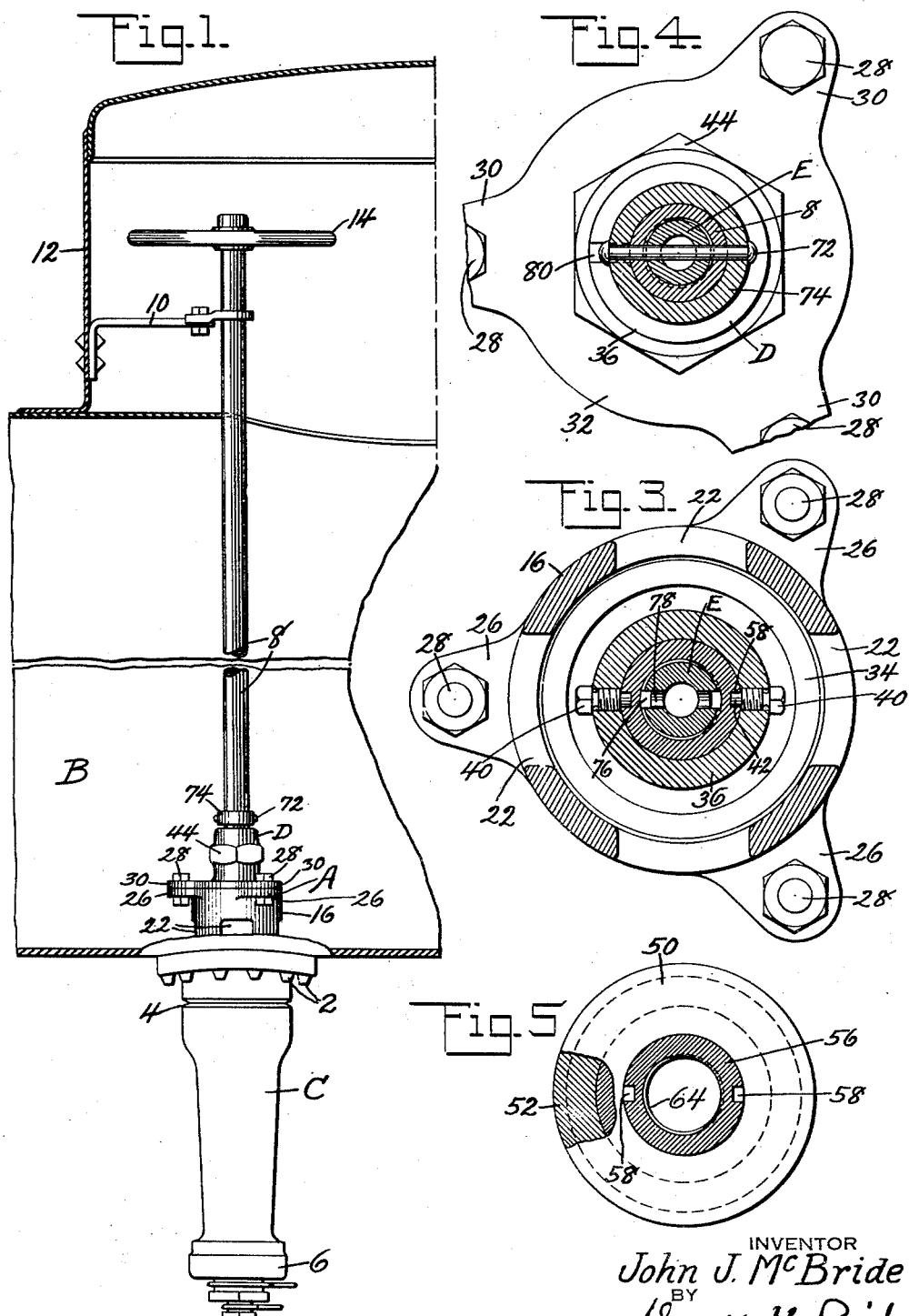

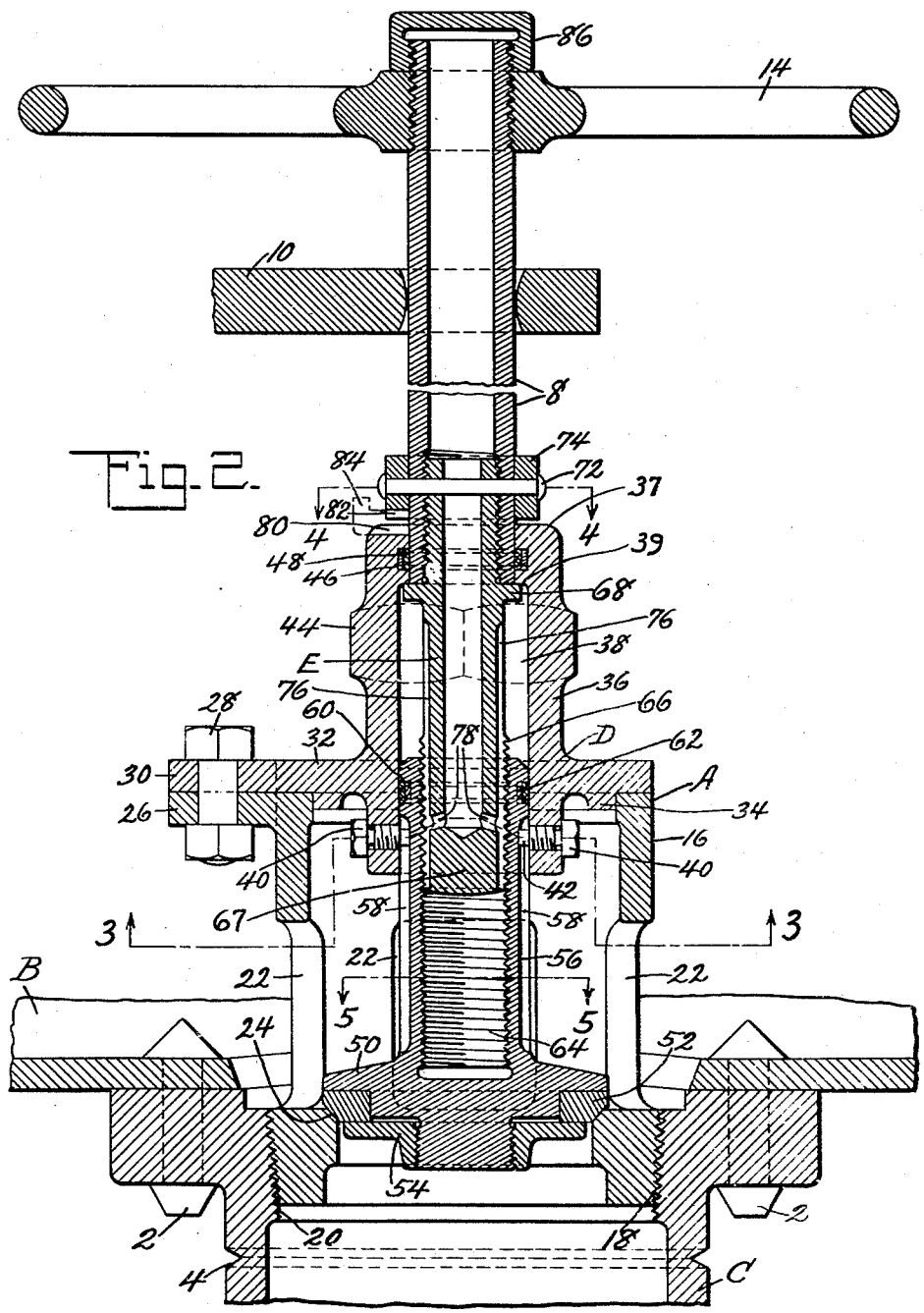

2,139,280

UNITED STATES PATENT OFFICE 2,139,280

LUBRICATED VALVE

John J. McBride, Bayonne, N. J., assignor to American Car and Foundry Company, New York, N. Y., a corporation of New Jersey Application January 6, 1937, Serial No. 119,213

13 Claims. (Cl. 137—21)

This invention relates generally to valves and in particular to discharge valves of the fully closed and lubricated type for use in connection with tank cars or similar containers.

Valves of the type now used have the moving parts exposed to the lading which may be corrosive, highly viscous or of such a nature as to cause deposits to form on the moving parts. In all these exposed valves the lading would sooner or later cause sticking of the valve and in many cases failure of the operating mechanism necessitating expensive and even dangerous repairs. It is an object, therefore, of this invention to provide a valve in which all moving or operating parts are completely protected from the lading.

Another object of the invention is the provision of a valve in which all operating parts are inclosed and fully lubricated.

A still further object of the invention is the provision of a valve of the fully closed and lubricated type in which provision is made for grinding of the valve seat when necessary.

These and other objects of the invention will be apparent to those skilled in the art from a study of the following description and accompanying drawings, in which:

Figure 1 is a side elevational view of the valve as applied to a tank;

Fig. 2 is an enlarged sectional view of the valve;

Fig. 3 is a sectional view taken on line 3—3 of Fig. 2;

Fig. 4 is a sectional view taken on line 4—4 of Fig. 2; and

Fig. 5 is a sectional view taken on line 5—5 of Fig. 2.

Referring now to the drawings in detail, it is seen that the valve body A is secured to the tank B by the customary outlet casting C. This outlet casting is secured to the tank by rivets 2 and is formed with the required frangible portion 4 which is capped by the usual safety cap 6. The valve is operated by means of valve rod 8 supported by bracket 10 from the tank dome 12. Hand wheel 14, or other operating means, is provided through which the valve may be operated.

The valve cage 16 is substantially circular in form and has the lower end threaded as at 18 to engage similar threads 20 within the outlet casting, thus permitting ready removal or installation of the valve cage. The valve cage is provided with openings 22 through which material may flow from the outside to the inside of the cage, while a beveled or other shaped valve seat 24 is formed at the lower end adjacent the threaded portion and immediately below the openings. The upper portion of the cage is formed with a plurality of ears or lugs 26 (3 in the instance shown) adapted to receive bolts 28 passing through similar lugs 30 formed as part of the cap D.

This cap D is formed by a plate 32 having the before-mentioned lugs formed therewith and with shoulder 34 engaging within the cage to provide an effective and strong positioning means for the cap, the main purpose of which will be later described. Formed at substantially the central portion of the plate is a cylinder 36, the interior of which has been finished to provide a smooth bore 38. The lower end of this cylinder projects through the plate 32 and is provided with guide screws 40 having blunt ends 42, the purpose of which will be later described. The upper portion of the cylinder is formed with an externally arranged hexagonal portion 44 adapted to receive a grinding wrench. The diameter of the cylinder at its upper end portion is reduced to provide an apertured head or cap 37 and an internal annular shoulder 39, and formed in said cap is a circumferential groove 46 in which a sealing packing 48 is arranged.

The valve itself consists of a head portion or body 50 to which is fastened valve gasket 52 by means of nut 54, and a hollow stem 56 having external guide grooves 58 formed therein, which grooves will receive the blunt ends of the guide screws thus preventing rotation of the valve relative to the cap. The upper end of the stem is formed with an external circumferential groove 60 adapted to receive packing 62 sealingly engaging bore 38 of projection or cylinder 36.

In order that the valve may be operated the interior of the stem is threaded as at 64 to be engaged by threads 66 cut on the lower end of a hollow stub operating rod E, the lower end of which may be closed as shown at 67. This stub operating rod has a shoulder 68 adjacent its upper end adapted to abut the shoulder 39 of cylinder cap 37 and form a thrust bearing as well as an abutment for the main operating rod 8 which extends through the aperture in cap 37 and is threaded onto the stub rod E and locked in place by pin or rivet 72. The pin or rivet also secures upper thrust collar 74 in place on the rod 8 immediately above the cylinder cap 37. Grooves 76 are cut in the threads 66 and communicate with the hollow operating rod by means of passages 78 for the passage of lubricant as will be later described.

The upper outer surface of the cylinder cap has a groove or keyway 80 cut therein, while thrust collar 74 has a similar groove or keyway 82 cut therein and these grooves or keyways, when in registry with each other, will receive a key 84, shown in dotted lines, which will prevent relative rotation between the operating rod and cap for a purpose to be described later. The upper end of the operating rod is provided with a hand wheel 14 held in place by cap nut 86.

The interior of the valve stem and the interior of the cylinder 36 each constitutes a lubricant reservoir, and during the assembly of the valve these reservoirs are preferably substantially filled with lubricant. Obviously, during operation of the valve due to rotation of the valve rod comprising the elements 8 and E, the volumes of these lubricant reservoirs will decrease or increase in unison, therefore to permit displacement of lubricant from the reservoirs during opening movement of the valve, the grease grooves 76 and the passages 78 are provided whereby lubricant may flow into and out of the hollow operating piston rod.

The operation of the valve is as follows: Assuming the parts in the position shown in Fig. 2, rotation of hand wheel 14 in the opening direction will lower the stub operating rod bringing thrust collar 74 against the top of the cylinder cap 37. Further rotation of the hand wheel will cause the valve to be lifted vertically, rotation of the valve being prevented by the guide slots 58 and guide screws 40, permitting the lading to flow out through ports or holes 22 and past the valve seat into the outlet. During this lifting of the valve lubricant in the reservoirs previously mentioned will be forced through passages 78 into the hollow operating rod E. To close the valve the hand wheel is operated in the reverse direction and with shoulder 68 engaging the inner surface of the cylinder cap the valve will be forced to closed position with the lubricant within the operating rod being sucked back into the cavities. It is obvious that the packing 48 and 62, together with the lubricant, will prevent entrance of any lading to the operating parts of the valve.

At the time of assembly and at certain other infrequent intervals it is necessary to grind the valve on its seat and this is readily accomplished by removing the lug bolts 28 and inserting key 84 in keyways 80 and 82 thus preventing any relative movement between the operating rod and the cap. Rotation of the operating rod will now cause rotation of the cap and, due to the guide bolts 40, rotation of the valve upon its seat. During this grinding operation the shoulder 34 on the cap plate acts as a centering guide preventing any lateral shift of the cap relative to the cage. In cases where the person doing the grinding wishes to do so while at the valve this may be accomplished by removal of the lug bolts and the use of a wrench applied to the hexagonal portion 44 of the cap cylinder.

Although the valve has been described more or less in detail, it is obvious that various modifications will suggest themselves to persons skilled in the art and such modifications are contemplated as fall within the scope of the following claims.

What is claimed is:

1. A discharge valve for containers comprising, a valve cage adapted to be secured to a container and formed with outlet ports and a valve seat, a cap secured to said cage and extending upwardly therefrom, a valve element slidably mounted within the cage, a valve stem projecting from said element and guided by said cap, operating means for said valve element threadedly engaged with the valve stem whereby rotation thereof will raise and lower said valve element, and sealing means between said cap and operating means and between said valve stem and cap thereby preventing ingress of material from the container.

2. A discharge valve for containers comprising, a valve cage adapted to be secured to a container and formed with outlet ports and a valve seat, a cap mounted on said cage and formed with a substantially cylindrical bore, releasable means connecting the cage and cap, a valve element slidably mounted within the cage to engage the valve seat, a piston-like stem projecting from said element into said bore, valve operating means having a threaded engagement with said stem, thrust means on said operating means adapted to engage said cap, and keyways formed on said cap and at least one of said thrust means adapted to receive a key to lock the cap and valve operating means together to permit grinding of the valve on its seat upon removal of the said releasable means.

3. A discharge valve for containers comprising, a valve cage adapted to be secured to a container and formed with outlet ports and a valve seat, a cap mounted on said cage and formed with a substantially cylindrical bore, releasable means securing the cap to said cage, a valve element slidably mounted within the cage to engage the valve seat, a piston-like stem projecting from said element into said bore, valve operating means having a threaded engagement with said stem, thrust means on said operating means adapted to engage said cap, keyways formed on said cap and at least one of said thrust means adapted to receive a key to lock the cap and the valve operating means together to permit grinding of the valve on its seat upon removal of the said releasable means, sealing means between said bore and piston-like stem, and additional sealing means between said operating means and cylindrical bore, said sealing means being so arranged as to prevent ingress of material from the container to said threaded engagement at all times.

4. A lubricated discharge valve for containers comprising, a valve cage adapted to be secured to a container and formed with a valve seat, a cap secured to the cage and formed with a substantially cylindrical bore constituting a lubricant chamber, a valve element slidably mounted within the cage to engage the valve seat, a hollow piston-like stem projecting from said element into said bore and receiving lubricant from the lubricant chamber, a substantially hollow operating means having threaded engagement with the interior of said stem and adapted to receive lubricant from the chamber or stem during movement of the valve, sealing means between said bore and piston-like stem, additional sealing means between said operating means and cylindrical bore, both said sealing means being so arranged as to prevent ingress of material from the container to said threaded engagement and providing with said cap an inclosure for lubricant.

5. A lubricated discharge valve for containers comprising, a valve cage adapted to be secured to a container and formed with a valve seat, a cap secured to the cage and formed with a substantially cylindrical bore, a valve element slidably mounted within the cage to engage the valve seat, a hollow piston-like stem projecting from said element into said bore, a substantially hollow operating means having threaded engagement with the interior of said stem, sealing means between said bore and piston-like stem, additional sealing means between said operating means and cylindrical bore, both said sealing means being so arranged as to prevent ingress of material from the container to said threaded engagement and providing with said cap an inclosure for lubricant, and means permitting transfer of lubricant between the hollow stem and inclosure and the interior of the operating means during operation of the valve.

6. A lubricated discharge valve for containers comprising, a valve cage adapted to be secured to a container and provided with a valve seat and outlet ports, a cap for said cage, a tubular guide element on said cap, a valve in said cage provided with a hollow stem extended into the guide element, and sealingly engaged with the latter, means restraining the valve stem and valve against rotary movement relative to the guide element, hollow valve actuating means extended into and operatively connected with the valve stem and sealingly engaged with the cap, said guide member, valve stem and valve actuating means constituting lubricant reservoirs, and ducts connecting the interior of the valve actuating means with the valve stem and guide element whereby to permit passage of lubricant to and from the valve actuating means during operation of the valve.

7. A lubricated valve for containers comprising, a valve cage adapted to be secured to a container and having outlet ports, a cap for said cage, a tubular guide element connected with the cage, a valve in the cage, a hollow valve stem having its upper end portion arranged in the guide element in sealing relation therewith, means restraining the valve against rotation relative to the guide element, a hollow rotatable valve actuator having its lower end portion operatively connected with the valve stem and another portion sealingly engaged with the guide element, said guide element and valve stem constituting lubricant reservoirs, ducts connecting the interior of the valve actuator with said reservoirs to permit passage of lubricant to and from the valve actuator upon operation of said valve.

8. A discharge valve for containers comprising, a valve cage, a valve therein, a cap for said cage, a hollow valve stem for said valve having its upper end portion sealingly engaged with said cap, said valve stem constituting a lubricant reservoir, means restraining the valve and valve stem against rotation, a rotatable valve rod sealingly engaged with said cap and having its lower end portion threadedly connected with the valve stem, said valve rod being hollow and having ducts communicating with the interior of the valve stem whereby upon operation of the valve lubricant may pass between the reservoir and the valve rod.

9. A discharge valve for containers comprising, a valve cage adapted to be secured to a container, a valve in said cage, a cap for said cage having a hollow guide element connected therewith, a hollow valve stem extended into the guide element and sealingly engaged therewith, a hollow valve rod extended into and threadedly connected with the valve stem, said guide element and valve stem constituting lubricant reservoirs and said valve rod being so formed as to permit passage of lubricant between said reservoirs, means for operating the valve rod to actuate the valve, and means establishing communication between the valve rod and reservoirs to permit transfer of lubricant between said valve rod and reservoirs upon actuation of the valve.

10. A discharge valve for containers comprising, a valve cage adapted to be secured to a container and provided with a cap, a valve in the cage provided with a hollow valve stem, a tubular guide element formed with the cap into which the valve stem extends and with which said stem is sealingly engaged, said valve stem and guide element constituting lubricant reservoirs, a hollow rotatable valve rod sealingly engaged with the guide element and threadedly connected with the interior of the valve stem to operate said valve, thrust means on said valve rod adapted upon rotation of said rod to engage the cap whereby continued rotation of said valve rod will operate said valve, and means establishing communication between said valve rod and reservoirs to permit passage of lubricant to and from the valve rod during operation of the latter.

11. A discharge valve for containers comprising, a valve cage adapted to be secured to a container and provided with outlet ports and a valve seat, a cap for said cage having a portion projecting upwardly therefrom and defining a first lubricant chamber, a valve in the cage, a hollow valve stem extended into the first lubricant chamber, said stem being sealingly engaged with the inner surface of the cap and constituting a second lubricant chamber, a valve operator engaging the interior of the valve stem, and ducts permitting passage of lubricant between the lubricant chambers, said operator extending beyond the projected portion of the cap and being sealingly engaged with said projected portion.

12. In a lubricated valve for containers, a cage, a cap secured to the cage and having a lubricant chamber formed therein, a valve in the cage, a hollow valve stem constituting a second lubricant chamber, a hollow valve actuator operatively connected with the valve stem, and ducts connecting the interior of the actuator with the lubricant chambers to permit passage of lubricant to and from the actuator upon operation of the valve.

13. In a lubricated valve, the valve cage provided with a seat, a valve to engage said seat, a hollow cap supported on the cage and constituting a lubricant chamber, a hollow valve stem extending into the lubricant chamber and sealingly engaged with the wall thereof and constituting a second lubricant chamber, a hollow valve operating means connected with the valve stem and adapted to hold lubricant, passages permitting transfer of lubricant from one lubricant chamber to the other, and ducts connecting the interior of the valve operating means with the lubricant chambers to permit passage of lubricant to and from said operating means upon operation of the valve.

JOHN J. McBRIDE.